L. C. MARSHALL.
PISTON PACKING.
APPLICATION FILED APR. 14, 1920.
1,421,802. Patented July 4, 1922.
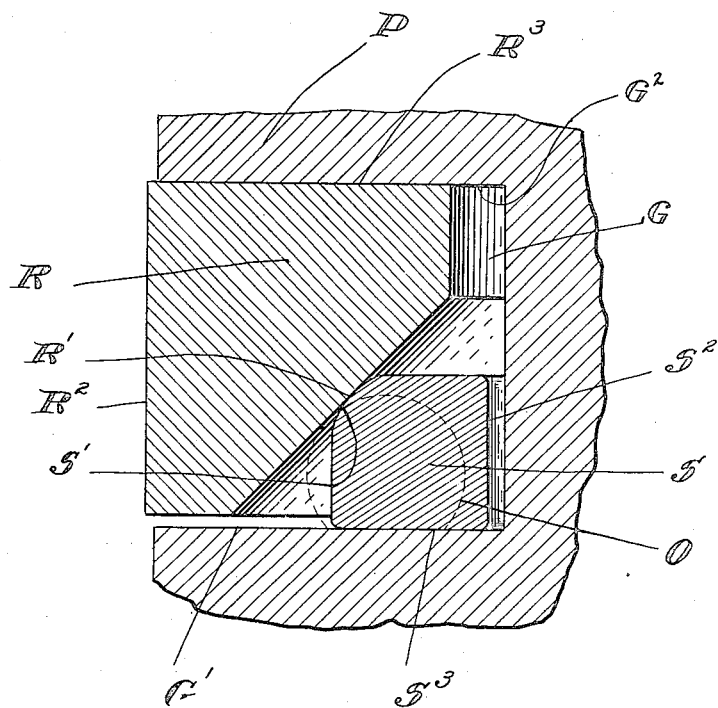
Inventor
Lewis C. Marshall
by Roberts Roberts & Cushman
his Attorneys

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON PACKING.

1,421,802.  Specification of Letters Patent.  Patented July 4, 1922.

Application filed April 14, 1920. Serial No. 373,912.

*To all whom it may concern:*

Be it known that I, LEWIS C. MARSHALL, a citizen of the United States of America, and resident of Walpole, in the county of Norfolk and State of Massachusetts, have invented new and useful Improvements in Piston Packings, of which the following is a specification.

My invention relates to piston packing, of the class which employs a metallic packing ring seated in a circumferential groove in the piston and bearing expansively against the interior surface of the cylinder. Particularly, this invention is concerned with the type of packing which is characterized by a ring against which an interior spring bears expansively to produce contact between the packing ring and cylinder and also between the packing ring and one of the plane surfaces of the circumferential groove in the piston, so as to prevent pressure leakage around the inside of the packing ring.

The characteristic novelty of this invention resides in the structure and physical peculiarities of the expanding spring-ring. The objects attained are, the provision of an expander spring ring of superior resiliency and durability, of such shape and structure that it exerts a maximum expanding effect, relatively to the cross-sectional area of the spring ring and the spaces available therefor between the packing ring and the walls of the piston-groove.

The drawing hereto annexed, which illustrates my invention in the form which I believe to be preferable, shows a portion of a piston with the essential factors of the packing, in cross-section.

P, represents the piston; G, the usual rectangular sectioned circumferential groove; R, is the packing ring, which is a split ring, of metal suitable for packing purposes. The inner face R' of the packing ring is beveled, and the spring ring S bears expansively against this beveled surface, so that the plane surface $R^3$ of the ring R is held seated against the plane surface $G^2$ of the groove G, and the cylindrical outer surface $R^2$ of the ring R is pressed against the wall of the cylinder (which is not here shown). Beveled-surface packing rings, thus held in contact with the groove surface and cylinder surface by means of an expansively acting inner spring ring, are well known in the art.

Heretofore, the expansion spring-rings used in conjunction with such packing rings as the one here illustrated, have been made of round spring steel wire, ground flat on one side, so as to present a cross-section like that indicated by the dotted line O. This mode of construction is detrimental, since the removal of one side of the spring-wire by grinding, destroys a substantial part of the tough resilient skin formed when the wire is drawn, and also since the major diameter of the cross-section of the finished ring lies radially to the piston, producing a tendency, when the spring ring is under stress, to roll outwardly instead of preserving its seat on the plane surface G' of the piston groove and maintaining the desired component of thrust on the packing ring in a direction longitudinally of the piston.

The improved spring ring S is formed of spring-wire, drawn to the desired and efficient final cross-sectional contour. In the preferred form here shown, the ring S is quadrantal in cross-section, having (when bent to ring-shape) a plane surface at $S^3$, adapted to seat properly on the plane surface G' of the circumferential groove G and a substantially cylindrical surface $S^2$ which is concentric or nearly so with the cylindrical inner surface of the groove. The toric surface S' of the spring ring makes tangential contact with the beveled surface R' of the packing ring, and exerts the expansive pressure on the packing ring so as to hold the latter not only against the cylinder surface, but also against the plane surface $G^2$ of the groove.

In this, the preferred form of spring ring, the maximum dimension is at or near the inner circumference, and the resilient material of which the spring ring is composed exerts its expansive stress evenly and in radial directions substantially parallel with the plane annular surface of the spring ring. By drawing the spring-wire through a die having the said quadrantal cross-section, and preserving in the finished spring ring the tough skin-surfaces produced by drawing the wire, the spring ring is more durable, more energetic, and more efficient, other things being equal, than a spring ring which, when finished has portions of this skin cut off.

Independently of the virtues conferred by preservation of the tough skin of the drawn wire, the shape of the spring ring, characterized by a plane bearing surface to engage the plane surface of the piston groove, and a cylindrical inner surface, is in itself a source of advantage and efficiency, for reasons above indicated.

Incidentally, it is obvious that the expanding ring section may be made nearly coincident in size with the cross-section of the annular space in which it is lodged; all of said space is available to be occupied by the expanding ring, if desired.

What I claim and desire to secure by Letters Patent is:

The combination, with a circumferentially grooved piston, of a packing ring provided with a beveled interior face, a spring ring of drawn wire having substantially the cross-section of a square with a rounded corner, and retaining the original cross-section produced by drawing, the rounded surface bearing expansively against the beveled face of the packing ring, and one of the plane surfaces seating on a plane surface of the circumferential groove in the piston.

Signed by me at Boston, Mass., this sixth day of April, 1920.

LEWIS C. MARSHALL.